Figure 1:
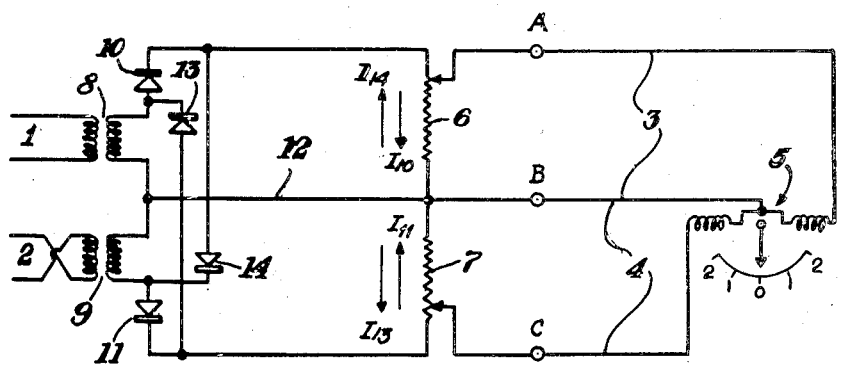

Nov. 30, 1948.    A. KENNEDY    2,454,807
CONTROL CIRCUITS
Filed Jan. 23, 1946

INVENTOR.
ARTHUR KENNEDY
BY
R H Morris
ATTORNEY

Patented Nov. 30, 1948

2,454,807

UNITED STATES PATENT OFFICE 2,454,807

CONTROL CIRCUITS

Arthur Kennedy, Wood-Ridge, N. J., assignor to Federal Telephone and Radio Corporation, New York, N. Y., a corporation of Delaware Application January 23, 1946, Serial No. 642,937

5 Claims. (Cl. 175—363)

My invention relates to control circuits, particularly to circuits for comparing the phase and/or amplitude of two alternating currents of like frequency.

It is often desirable to actuate a relay or an indicator in response to a predetermined difference of amplitude or of phase of two alternating voltages. In radio goniometric practice, for example, it is desirable to obtain a direct current control voltage the polarity and amplitude of which may accurately indicate the bearing of a received radio wave. Or in power circuits, in synchronizing and connecting two alternators together, it is necessary to know the relative amplitude and phase of the voltages at the terminals before connecting switches are closed. In such practices, it is more desirable that the controlled or auxiliary circuits respond to differences of voltage than to respond to absolute values of the voltages, it being necessary or desirable, for example to selectively operate one of two balanced relays, such as grid controlled gas tubes, while the other relay remains inactive regardless of the absolute values of the control voltages.

An object of my invention, accordingly, is an improved control circuit.

More specifically, an object of my invention is a control circuit for actuating an auxiliary device, or circuit to be controlled, in such a way that the auxiliary circuit may remain inactive until two controlling voltages assume a predetermined difference in amplitude.

Another object of my invention is a control circuit for actuating an auxiliary circuit in response to a predetermined difference in phase of two controlling voltages.

Still another object of my invention is a control circuit for producing a control voltage, the amplitude of which is independent of the absolute amplitude of controlling voltages.

The objects of my invention are realized by circuits which comprise, essentially, a pair of potentiometers connected in series with a balanced three wire output circuit connected to the end and common terminals of the potentiometers. The two sources to be compared are provided with means for passing current from each source through each potentiometer, the two currents in each potentiometer being opposed. The output voltages across the two potentiometers may be balanced or adjusted to equal values, for equal or unequal voltages at the two sources, these values being chosen at any desired level including zero.

According to one embodiment of my invention, each potentiometer is connected tthrough a rectifier to one of the primary voltage sources, the potentiometers being connected in series and the output terminals for the control voltage being connected across the outer ends of the potentiometers. A portion or all of each potentiometer is cross connected through an additional rectifier to the opposite voltage source, so that a direct current voltage from one alternating current source is algebraically added to the direct current voltage from the other alternating current source.

Figure 2:
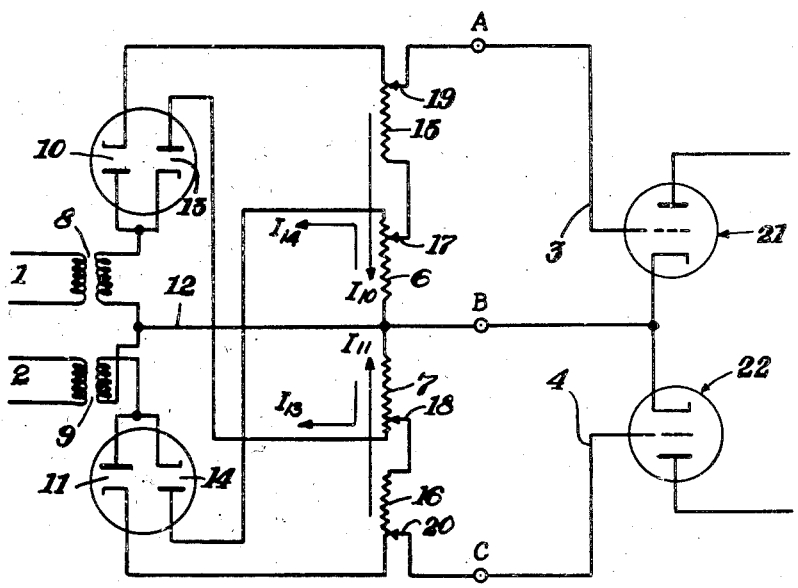

Preferred features of my invention are defined in the appended claims and specific embodiments thereof are described in the following specification and shown in the accompanying drawings in which Fig. 1 shows a simplified wiring diagram of one of my novel control circuits, and Fig. 2 shows a wiring diagram of another control circuit embodying my invention.

In Fig. 1, the voltage sources to be compared are shown at 1 and 2, and the output circuits to be controlled are shown at 3 and 4. The output circuits may be connected, for example, to a meter 5 for visually indicating the relative values of voltages at 1 and 2, or they may be connected to a balanced work circuit such as the windings of a differential relay or grids of evacuated or gas filled thermionic tubes. In fact, it is contemplated that the output circuits 3 and 4 may be connected to any device or circuit which should, preferably, respond only to the differences of amplitude or phase of the voltages 1 and 2, and which should be protected from extreme values of voltages 1 and 2.

The circuit of Fig. 1 resembles, approximately, a four sided bridge, containing two potentiometers 6 and 7, and two coupling transformers 8 and 9. Rectifiers 10 and 11 are connected, respectively, between the transformer secondary windings and the conjugate potentiometers. With the connection 12 horizontally across the center of the bridge, a direct current component of the sources 1 passes through the potentiometer 6 and a direct current component of the source 2 passes through potentiometer 7, rectifiers 10 and 11 being oppositely polarized with respect to the center of the bridge so that the current in the potentiometers flow in opposite directions. The primary or secondary connections to one transformer is reversed with respect to the connections of the other transformer so that one A. C. wave is displaced 180 degrees from the other and so that the direct current pulses in the potentiometers are in time phase and may be balanced.

An important and characteristic feature of my invention is means for keeping the voltages across each potentiometer proportional to the difference of the two voltage sources 1 and 2 and independent of the absolute values of the sources. The voltage source 1 is connected through rectifier 13 across potentiometer 7, and voltage source 2 is connected through rectifier 14 across potentiometer 6. Rectifier 13 is so polarized that the output current of rectifier 13 in potentiometer 7 is opposed to the current of rectifier 11, and rectifier 14 is so polarized that the output current of rectifier 13 in potentiometer 6 is opposed to the current of rectifier 10.

Let it be assumed sources 1 and 2 are equal in voltage and phase and that the resistance drop through all the rectifiers are equal. Then, in operation, the current $I_{10}$ through the rectifier 10 and current $I_{14}$ through rectifier 14 will, in potentiometer 6, exactly balance and produce a net voltage of zero between terminals A and B. Currents $I_{11}$ and $I_{13}$ of rectifiers 11 and 13 will likewise produce a zero voltage across potentiometer 7, or between terminals B and C.

Now assume the voltage at 1 increases, say 10 per cent, with respect to source 2. Current $I_{10}$ increases 10 per cent over $I_{14}$ and terminal A becomes 10% more positive with respect to terminal B, and current $I_{13}$ correspondingly increases over $I_{11}$ making terminal C 10 per cent more negative with respect to terminal B. Terminal A, hence, becomes 20% more positive with respect to terminal C. In this embodiment of my invention, the control voltage changes at the terminals A and C are actually amplified with respect to the changes at the source. Further, the absolute voltages at terminals A, B, and C are dependent only on the difference voltages at the sources 1 and 2 and are quite independent of the peak values at the source. This feature of my invention is of particular importance when the sources 1 and 2 may fluctuate as with poor power supply regulation and when the terminals are connected, say, to a meter the winding of which could easily be damaged with over voltages. In radio goniometers, fading or spurious signal voltages applied equally to transformers 1 and 2 would not register at terminals A, B and C.

As shown in Fig. 2, my novel control circuit is provided with adjustments for each of the voltages that are added together in the potentiometers. Such adjustments are desirable for selecting any predetermined static bias between terminals A, B and C, as when the terminals are connected, for example, to the grids of amplifier tubes. The amplifier tubes shown at 21 and 22 may be of the grid controlled vacuum or gas filled type with the input circuits connected, respectively, to terminals A and B, and C and B. The rectifiers may be of the thermionic double-diode type, rectifiers 10 and 13 being inclosed in one envelope, while rectifier 11 and 14 are inclosed in a second envelope. Each rectifier comprises an anode and a cathode, either directly or indirectly heated, the connections to the electrodes being so chosen that the direct current components flow in the same directions as in Fig. 1. The alternating current sources 1 and 2 are connected, through transformers 8 and 9, to the bridge circuit as in Fig. 1. The resistances in which the several rectified currents are combined comprises resistor 6 and 7 connected, respectively, in series with resistors 15 and 16. The potentiometer consisting of resistors 6 and 15 is connected across rectifier 10 and the secondary winding of transformer 9, and the potentiometer 7—16 is connected across rectifier 11 and the secondary winding of transformer 9. For reasons which will become apparent hereinafter, one end of resistor 15 is connected to an adjustable contact 17 on resistor 6, and one end of resistor 16 is connected to an adjustable contact 18 on resistor 7. Terminals A and C are connected to sliding contacts 19 and 20, respectively, on resistors 15 and 16.

A direct current component of source 1 is supplied to resistor 7 through rectifier 13, while a direct current component of source 2 is fed to resistor 6 through rectifier 14, the rectifiers being so polarized, as in Fig. 1, that the currents in each potentiometer (6, 15 and 7, 16) from the two sources are opposed. For easy reference, the directions of the current components $I_{10}$, $I_{11}$, $I_{13}$, and $I_{14}$ of rectifiers 10, 11, 13 and 14, respectively, through the resistors of the potentiometers are indicated by arrows.

It is now apparent that the proportion of positive voltage across terminals A and B may be adjusted by moving contact 19 on resistor 15, and the proportion of negative voltage across terminals A and B may be controlled by contact 17 on resistor 6, so that the static bias of terminal A with respect to terminal B may be easily selected. The proportions of positive and negative voltages for terminal C, likewise, is controlled by contacts 20 and 18. The range of adjustability of the terminal potentials at A or C, with the circuit connections shown are from zero to the positive maximum of the rectified sources, and by reversing the polarity of the rectifiers, the ranges are extended to the negative maximums of the sources. The advantage of such flexibility of adjustment becomes apparent when threshold grid potentials, say, of relay tubes 21 and 22 must be accurately established. In Fig. 2, as in Fig. 1, the potentials at the terminals will respond only to changes in the relative potentials of the sources 1 and 2.

The circuits of Figs. 1 or 2 also respond to relative changes in phase of the alternating currents at 1 and 2, and the scale of meter 5 may be calibrated to indicate the phase displacement, or the relays 21 and 22 adapted to appropriate uses. Assume the potentials at the terminals are balanced when the sources 1 and 2 are in phase. In this condition, the direct current pulses in the potentiometers are in phase and may be algebraically added to obtain the balance. If, now, source 1 lags source 2 by, say 10 degrees, current $I_{10}$ is opposed by current $I_{14}$, Fig. 2, during a shortened portion of the cycle and the potential at terminal A increases positively with respect to terminal B, and the potential at terminal C decreases with respect to terminal B.

My novel control circuit is sensitive to changes in relative amplitudes or phases of voltages to be compared but is quite insensitive to in-phase or like changes in those voltages. My novel circuit is simple in construction and is easy to adjust and operate.

I claim:

1. In combination in a control circuit, two transformers, the secondary windings of the transformers being connected in series, a pair of rectifiers connected to the outer ends respectively of each secondary winding, the polarity of the rectifiers of each pair being reversed, two potentiometers, one rectifier of each of said pairs being connected to one of said potentiometers, the remaining rectifiers being connected to the remaining potentiometer, and a center connection joining a point on the series connection between the secondary windings of the transformers with a point on the connection between the two potentiometers.

2. A control circuit comprising a pair of potentiometers, two sources of voltage to be compared, and two rectifiers, connections from one source through one rectifier to one potentiometer, connections from the second source through the second rectifier to the second potentiometer, means including a third rectifier for passing a direct current component of said one source through said second potentiometer opposite in direction to the current from said second source, including a fourth rectifier means for passing a direct current component of said second source through said one potentiometer opposite in direction to the current from said one source, and a center connection joining a point on the connection between the two sources of voltage with a point of the connection between the two potentiometers.

3. An electrical control comprising a first rectifier, a first alternating current source connected in series with said first rectifier, a second rectifier, a second alternating current source connected in series with said second rectifier, a first pair of resistors, connected across said first rectifier and said first source, a second pair of resistors connected across said second rectifier and said second source, a third rectifier connected in series with said first source, and with one resistor of said second pair of resistors and a fourth rectifier connected in series with said second source and with one resistor of said first pair of resistors.

4. A circuit system for comparing two alternating currents, comprising four resistors connected in series, output terminals connected to the end resistors, means connected across two of said resistors for passing a direct current component of one alternating current through said two resistors, means connected across the two remaining resistors for passing a direct current component of a second alternating current through said remaining resistors, and connections for passing a direct current component of said one alternating current through one of said remaining resistors in a direction opposed to the second mentioned component, and connections for passing a direct current component of said second alternating current through one of said two resistors in a direction opposed to the first-mentioned component.

5. The combination according to claim 1 wherein each potentiometer comprises two resistors in series the end of one resistor being connected to an adjustable contact on the other resistor, and said one rectifier of each of said pairs is connected to the ends of said potentiometer and said remaining rectifiers are connected to the ends of said other resistor, and output terminals connected to the ends of the said potentiometers.

ARTHUR KENNEDY.

No references cited.